Nov. 17, 1931.  H. M. HEFFLEY  1,832,206
GASOLINE AND OIL TANK LOCKED CAP
Filed April 23, 1930
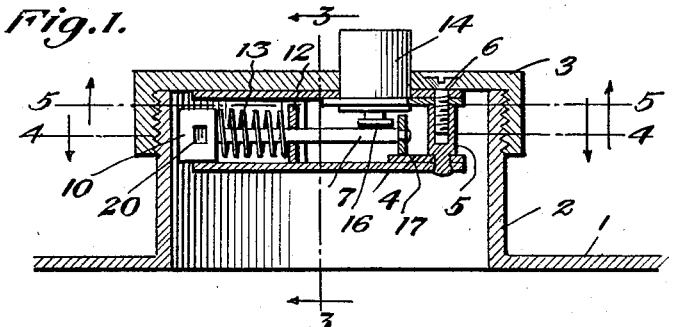
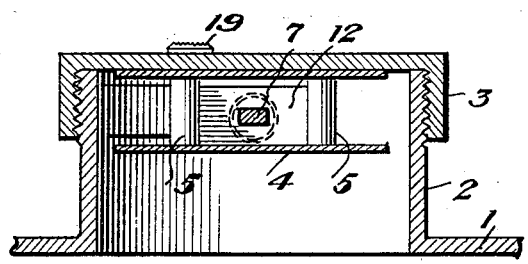
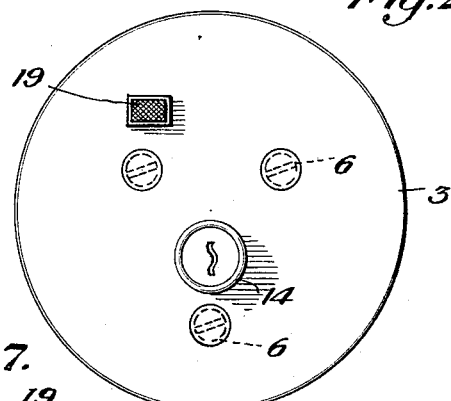
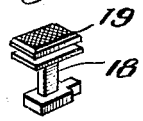
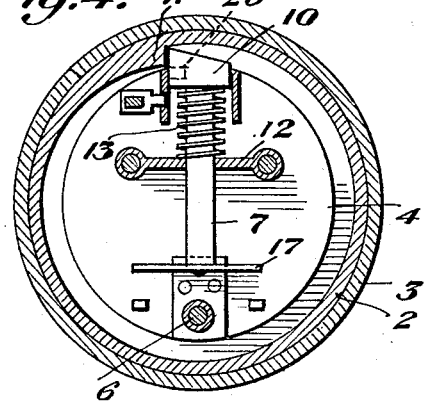
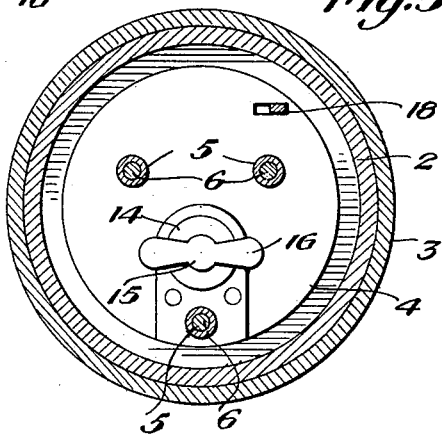
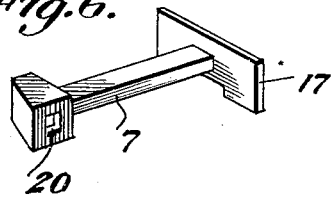
H. M. Heffley,
INVENTOR
BY Victor J. Evans
ATTORNEY Patented Nov. 17, 1931

1,832,206

UNITED STATES PATENT OFFICE

HOWARD M. HEFFLEY, OF OMAHA, NEBRASKA

GASOLINE AND OIL TANK LOCKED CAPS

Application filed April 23, 1930. Serial No. 446,645.

This invention relates to new and useful improvements in locking caps of gasoline, lubricant and other supply tanks of motor vehicles and has for the primary object, the provision of a device of the above stated character especially adapted to prevent theft of the contents of the tank of a motor vehicle when left parked or unattended.

Another object of this invention is the provision of a closure cap having locking means to prevent the removal thereof by an unauthorized person and which may be easily and quickly applied to a tank in the usual way and will require the use of a proper key before the removal may be made.

A further object of this invention is the provision of a locking cap of the above stated character which will be simple, durable and efficient and which may be manufactured and sold at a comparatively low cost.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which:

Figure 1 is a vertical sectional view illustrating a locking cap constructed in accordance with my invention.

Figure 2 is a top plan view illustrating the same.

Figure 3 is a sectional view taken on the line 3—3 of Figure 2.

Figure 4 is a sectional view taken on the line 4—4 of Figure 3.

Figure 5 is a sectional view taken on the line 5—5 of Figure 1.

Figure 6 is a detail perspective view, illustrating the plunger, and

Figure 7 is a detail perspective view, illustrating the latch.

Referring in detail to the drawings, the numeral 1 indicates a fragmentary portion of the fuel tank used upon a motor vehicle and has the usual filling neck 2 provided with screw threads to receive corresponding screw threads on a closure cap 3. The cap has located on its inner face a lock frame or casing 4 provided with internally screw threaded ports 5 to receive screws 6 after passing through the cap 3 and the screws are adapted to have their heads countersunk in the cap and covered over with solder or other suitable material to prevent tampering with the lock which will be hereinafter more fully described.

A plunger 7 is slidably mounted in the frame 4 and carries at one end a head 10 provided with a bevel face as clearly shown in Figure 4 and is adapted to engage one face of an inclined shoulder 11 formed on the interior of the neck 2 of the tank 1. Suitable supports 12 carried by the frame 4 slidably support the plunger 7 and the latter has a coil spring 13 mounted thereon between the head 10 and the support 12 for normally urging the head in engagement with the inner wall of the neck 2.

A lock 14 of any well known construction is carried by the frame 4 and extends exteriorly of the cap 3 as shown in Figure 1 to receive a key for actuating the device. A stem 15 forms part of the lock 14 and carries oppositely disposed lugs or arms 16 engaging a bridge 17 formed on the plunger 7 whereby the operation of the lock 14 with the proper key, the plunger will be retracted to disengage the head from the shoulder 11. A latch 18 is slidably mounted in the frame 4 and cap 3 and is provided with a suitable finger piece 19 whereby the latch 18 may be moved into and out of a notch 20 formed in the head 10.

Normally the latch 18 is positioned out of the notch of the plunger 7 and the spring 13 urges the plunger in engagement with the wall of the neck 2 so that in case an unauthorized person endeavors to unscrew or remove the cap 3 from the tank, the head 10 abuts the shoulder 11 and prevents the removal of the cap. To remove the cap when desiring to fill the tank 1, the proper key is inserted into the lock 14 and turned to retract the bolt 7 through the arms 16 engaging the bridge 17. The operator then slides the latch 18 into the notch 20 holding the plunger in a retracted position thus permitting the free removal of the cap 3 in the usual manner. After the cap 3 has been positioned partly on the neck 2 the latch 18 may be disengaged from the notch 20 permitting the head to ride against the inner wall of the neck and owing to the inclination of the shoulder 11 the cap will be permitted to be turned on the neck freely and when once positioned thereon, the head engages behind the shoulder 11 and prevents the removal of the cap until the proper key has been inserted in the lock to cause the retraction of the plunger 7.

While I have shown and described the preferred embodiment of my invention it will be understood that minor changes in construction, combination and arrangement of parts may be made without departing from the spirit and scope of the invention as claimed.

Having thus described the invention, what I claim is:

In combination, a filling neck of a fuel tank and a closure cap removably secured thereto by screw threads, a shoulder in the neck and having an abrupt face and an inclined face, a lock frame secured to the inner face of the cap, a support in the frame, a plunger slidable in said support, a head at one end of the plunger and having a socket in one side face thereof and provided with a bevelled end adapted to ride over the inclined face of the shoulder when the cap is threaded on the neck and to engage the abrupt face of the shoulder when the cap is turned in an opposite direction to prevent removal of the cap from the neck, a spring on the plunger between the head and the support to normally urge the head toward the shoulder, a plate at the other end of the plunger and slidably engaging the frame to cooperate with the support in slidably supporting the plunger, a key operated means extending through the cap and engaging the plate to retract the plunger, and a catch extending through the cap and a portion of the frame to be manually moved into the socket for holding the plunger in a retracted position for permitting the cap to be turned off the neck.

In testimony whereof I affix my signature.

HOWARD M. HEFFLEY.